United States Patent [19]

Lagow et al.

[11] Patent Number: 4,675,452

[45] Date of Patent: Jun. 23, 1987

[54] PERFLUORINATED POLYETHER FLUIDS

[76] Inventors: Richard J. Lagow, 6204 Shadow Mountain, Austin, Tex. 78731; Daniel F. Persico, 141 Edgewood Rd., Westwood, Mass. 02090

[21] Appl. No.: 756,781

[22] Filed: Jul. 18, 1985

[51] Int. Cl.$^4$ .......................................... C07C 43/313
[52] U.S. Cl. ................. 568/601; 252/52 A; 252/54; 568/603; 568/604
[58] Field of Search ............... 568/601, 603, 604, 591, 568/593

[56] References Cited

U.S. PATENT DOCUMENTS 4,009,128  2/1977  Vandenberg .................. 528/416

FOREIGN PATENT DOCUMENTS 1226566  3/1971  United Kingdom .

OTHER PUBLICATIONS

G. E. Gerhardt and R. J. Lagow, J. Orig. Chem., 43 4505 (1978).
G. E. Gerhardt and R. J. Lagow, J. Chem. Sci. Perkin Trans. 1, 1321.
G. E. Gerhardt et al., J. Polym. Sci. Polym. Chem. Ed. 18, 157 (1979).
D. F. Persico et al., J. Am. Chem. Soc., 107, 1197 (1985).
W. R. Hasek et al., J. Am. Chem. Soc., 82, 543 (1960).
W. A. Sheppard, Angew. Chem. Int. Ed., 1, 467 (1962).
P. E. Aldrich and W. A. Sheppard, J. Org. Chem., 29, 11 (1964).
W. A. Sheppard, Org. Syn., 44 39 (1964).
R. J. DePasquale, J. Org. Chem., 38, 3025 (1973).
W. C. Smith, Angew. Chem. Int. Ed., 1, 467 (1962).
G. E. Gerhardt and R. J. Lagow, J. Chem. Soc., Chem. Commun., 8, 259 (1977).

*Primary Examiner*—Howard T. Mars
*Attorney, Agent, or Firm*—Hamilton, Brook, Smith and Reynolds

[57] ABSTRACT

Perfluorinated polyethers comprising copolymers of hexafluoroacetone and epoxide and/or oxetanes are described. The perfluorinated polyethers are useful as lubricants.

6 Claims, No Drawings

PERFLUORINATED POLYETHER FLUIDS

GOVERNMENT SUPPORT

The invention described herein was supported in whole or in part by the United States Air Force Office of Scientific Research.

FIELD OF THE INVENTION

This invention is in the field of polymer chemistry.

BACKGROUND OF THE INVENTION

Perfluoropolyethers are highly regarded in the specialty lubricant field because of their long liquid range, (i.e. liquid over a wide range of temperatures) low vapor pressure and high thermal and oxidative stability. Because of these properties, they are excellent high performance lubricants and have many other uses as oils, waxes, greases, hydraulic fluids and heat transfer fluids.

Commercially available perfluoropolyethers are produced by the polymerization of hexafluoropropylene oxide (DuPont KRYTOX TM and by photooxidative polymerization of perfluoro-olefins, utilizing oxygen and ozone (Montedison FOMBLIN TM ). Each product has an advantage over the other. The KRYTOX TM fluids which have a regularly branched structure have superior high temperature thermal stability (10°-15° F.) over FOMBLIN TM fluids. The FOMBLIN TM fluids, random polymers having O—C—O units in their backbone, have a slight advantage (10°-15° F.) in their longer liquid range at low temperature.

Two very interesting analytical themes seem to be developing in the analysis of lubrication properties and thermal stabilities of perfluoropolyethers. Many researchers feel that the unusual liquid properties of the random Fomblin Z copolymer is a direct result of the inclusion of difluoromethylene oxide ($CF_2O$) linkages in the polyether which provide hinge-like flexibility. Another view is that the higher thermal stability of the perfluoropropylene oxide polymers results in some way from the branching (trifluoromethyl group) in the polymer. An emerging view is that the difluoromethylene unit causes the lower thermal stability of the Fomblin Z material with respect to the KRYTOX TM material.

DISCLOSURE OF THE INVENTION

This invention pertains to a new class of perfluorinated polyether fluids comprising perfluorinated copolymers of hexafluoroacetone (HFA) and cyclic oxygen-containing compounds. The new perfluoroethers are produced by the copolymerization of hexafluoroacetone with the oxygen containing cyclic comonomers selected from ethylene oxide, propylene oxide, epoxybutane and/or trimethylene oxide (oxetane) or substituted derivatives thereof and subsequent per-fluorination of the resulting copolymer. The perfluorohexafluoroacetone copolymers have from 1% up to 50% O—C—O linkages in their backbone chain and branched (trifluoromethyl-substituted) methylene units in a regular copolymer sequence. The hexafluoroacetone copolymers of this invention are useful as lubricants (greases and oils) at temperatures ranging from about $-50°$ C. to about 300° C.

The combined features of the O—C—O linkages and of the branching confer dual properties of a long liquid range and a high thermal stability. For example, a 1:1 HFA/epoxide alternating copolymer structure contains approximately 50% of the O—C—O linkage in the structure. This linkage is believed responsible for low temperature liquidity. In contrast, FOMBLIN TM fluids contain approximately 10-20% of this linkage. In preliminary tests, the perfluorinated hexafluoroacetone copolymers of this invention exhibited thermal stability comparable to a higher molecular weight KRYTOX TM fluid.

The hexafluoroacetone copolymers are copolymers of hexafluoroacetone and oxygen-containing cyclic compounds. The oxygen-containing cyclic compounds can be the epoxides, such as ethylene oxide, propylene oxide and epoxy-butane and/or oxetane (trimethylene oxide) or substituted derivatives of these compounds.

Perfluorinated hexafluoroacetone/epoxide copolymers are represented generally by the formula:

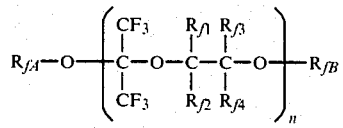

wherein $R_{f1}$ is F, $CF_3$, $C_2F_5$, $C_3F_7$, c-$C_6F_5$ or c-$C_6F_{11}$;
$R_{f2}$, $R_{f3}$ and $R_{f4}$ are F, $CF_3$ or $C_2F_5$;
$R_{fA}$ is $CFR_{f1}R_{f2}CR_{f3}R_{f4}$ or $CFR_{f3}R_{f4}$;
$R_{fB}$ is $CF_3$, $C_2F_5$ or $C_3F_7$;
and $n = 8$-$50$.

Hexafluoroacetone/oxetane copolymers are represented by the formula:

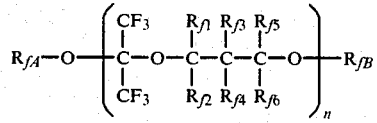

wherein
$R_{f1}$ is F, $CF_3$, $C_2F_5$, $C_3F_7$, c-$C_6F_5$ or c-$C_6F_{11}$;
$R_{f2}$ is F, $CF_3$ or $C_2F_5$;
$Rf_3$ to $R_{f6}$ is F or $CF_3$;
$R_{fA}$ is $CFR_{f1}R_{f2}CR_{f3}R_{f4}CR_{f5}R_6$, $CFR_{f3}R_{f4}CR_{f5}R_{f6}$ or $CFR_{f5}R_{f6}$;
$R_{fB}$ is $CF_3$, $C_2F_5$ or $C_3F_7$;
and $n = 8$-$50$.

Perfluorinated hexafluoroacetone/epoxide/oxetane copolymers are represented by the formula:

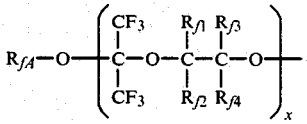

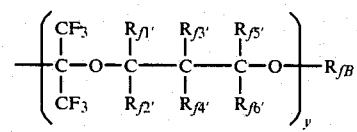

wherein
$R_{f1}$ and $R_{f1}'$ are F, $CF_3$, $C_2F_5$, $C_3F_7$, c-$C_6F_5$ or c-$C_6F_{11}$;
$R_{f2}$, $R_{f2}'$, $R_{f3}$ and $Rf_4$ are F, $CF_3$ or $C_2F_5$;
$R_{f3}'$-$R_{f6}'$ or F or $CF_3$;

$R_{f4}$ is $CFR_{f1}R_{f2}R_{f4}$, $CFR_{f3}R_{f4}$, $CFR_{f1}'R_{f2}'CR_{f3}'R_{f4}'CR_{f5}'R_{f6}'$, $CFR_{f3}'R_{f4}'CR_{f5}'R_{f6}'$ or $CFR_{f5}'R_{f6}'$;

$R_{fB}$ is $CF_3$, $C_2F_5$ or $C_3F$;

and x and y are integers greater than 1 such that $x+y=8-50$.

BEST MODE OF CARRYING OUT THE INVENTION

The perfluorinted hexafluoroacetone copolymers are produced by perfluorinating, in a controlled, stepwise manner, copolymers of hexafluoroacetone and oxygen-containing cyclic comonomer(s).

Several techniques exist for synthesizing hexafluoroactone/epoxide and hexafluoroactone/oxetane copolymers. See e.g. U.S. Pat. No. 3,475,376; U.S. Pat. No. 3,485,792; U.S. Pat. No. 3,502,619; U.S. Pat. No. 3,530,097; and U.S. Pat. No. 3,624,039. The polymerization reaction of HFA with an epoxide is illustrated by the following equation:

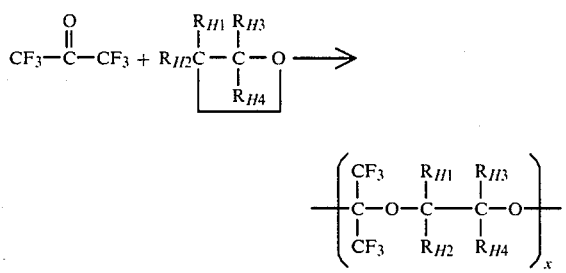

wherein $R_{H1}$ is H, $CH_3$, $C_2H_5$, $C_3H_7$, $c$-$C_6H_5$ or $c$-$C_6H_{11}$;
$R_{H2}$ is $CH_3$ or $C_2H_6$;
$R_{H3}$ and $R_{H4}$ is H or $CH_3$;
and $X=500-1000$.

The polymerization reaction of HFA with oxetane is exemplified by the following formula:

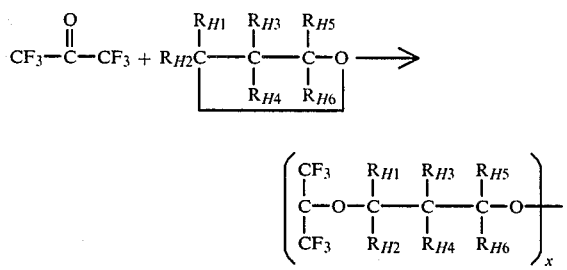

wherein $R_{H1}$ is H, $CH_3$, $C_2H_5$, $C_3H_7$, $c$-$C_6H_5$ or $c$-$C_6H_{11}$;
$R_{H2}$ is $CH_3$ or $C_2H_6$;
$R_{H3}$ to $R_{H6}$ is H or $CH_3$;
and $x=500-1000$ A preferred method of producing a 1:1 alternating hexafluoroacetone/epoxide copolymer is a method of bulk polymerization with an anionic catalyst such as tetraethylamine chloride, cesium fluoride or potassium fluoride.

The polymerization reaction is performed under a vacuum in an inert environment (e.g. under a nitrogen atmosphere). The anionic catalyst is added to a reaction vessel in an inert atmosphere. The vessel is evacuated and cooled either with liquid nitrogen to $-196°$ C. or to $-78°$ C. with a dry ice acetone slush. HFA and the epoxide or oxetane is condensed into the vessel which is then sealed under a vacuum. The vessel is then warmed to about $-78°$ C. (e.g. by placing it into a dry ice bath) if liquid nitrogen cooling has been used. Thereafter the reaction vessel is warmed to room temperature and maintained for about 1-6 hours. After synthesis is complete, volatile components are removed by evaporation under a vacuum. The solid polymer product is recovered from the vessel.

The hexafluoroacetone polymers are perfluorinated by elemental fluorination. Fluorination is performed in a suitable fluorination apparatus. A preferred apparatus is that described by Lagow, R. J., *Progress in Inorganic Chemistry*, 26, 161 (1979). Another suitable fluorination apparatus is described in U.S. Pat. No. 4,510,335, the teachings of which are incorporated by reference herein.

Fluorine gas mixed with helium as the diluent is added to the reaction chamber containing the hexafluoroacetone/epoxide or hexafluoroacetone/oxetane polymer. To avoid extensive chain degradation during the fluorination process, fluorination is performed in a controlled, stepwise manner by initially contacting the polymer with a dilute fluorine mixture (approximately 1-2% fluorine gas) and then increasing the fluorine concentration in a stepwise fashion over an interval of about 48 hours. Temperature is also an important parameter which is generally increased over the course of fluorination (from room temperature to about 60° C.).

The specific conditions of fluorination vary widely for the different polymers. Conditions are dependent upon the stability of the polymer being fluorinated. For example, as detailed in the Exemplification section below, optimal conditions of temperature and fluorine concentration are significantly different for HFA/EO copolymers and HFA/TMO polymers (see Table 1). Optimal conditions of fluorination for the various types of polymers can be ascertained experimentally. Further, conditions of fluorination can be regulated to control degradation of the polymer during fluorination and as a result, the size of the resulting perfluorinated product.

The fluorination of three hexafluoroacetone copolymers is depicted below:

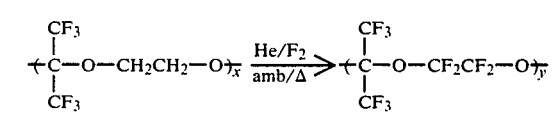

Hexafluoroacetone/Ethylene Oxide Copolymer

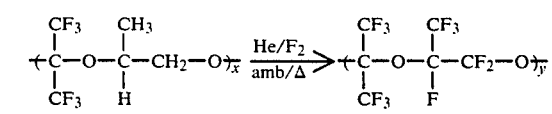

Hexafluoroacetone/Propylene Oxide Copolymer

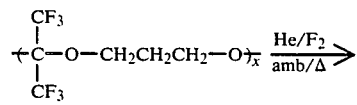

Hexafluoroacetone/Oxetane Copolymer

In general, perfluorinated copolymers having from about 10 to about 50 repeat units are desirable. These copolymers represent those having the optimum combination of thermal stability and liquid range. The perfluorinated hexafluoroacetone/epoxide and perfluorinated hexafluoroacetone/oxetane polymers have features which confer high thermal stability and low temperature liquidity. They represent a combination of the advantageous properties FOMBLIN TM and KRYTOX TM systems. The perfluorinated hexafluoroacetone copolymers of the invention contain O—C—O linkages which provide flexibility in the backbone chain, a property which is believed to provide a long liquid range. As pointed out, A 1:1 alternating copolymer contains 50% of this O—C—O linkage, which is more than is in the FOMBLIN TM fluids.

The polymers also contain branched methylene units. This branching is believed to be responsible for the thermal stability of perfluorinated polyethers. The extent of branching, of course, depends on the kind and number of pendant groups on the backbone in the perfluorinated hexafluoroacetone copolymers. This can be modified by altering the epoxide or oxetane monomers incorporated into the polymers and thus the polymers can be tailored for specific end uses.

In initial tests, perfluorinated hexafluoroacetone/propylene oxide, perfluorinated hexafluoroacetone/ethylene oxide and perfluorinated hexafluoroacetone/oxetane oligomers having an average number of repeat units of about 8-16 (Mn 2,800-6,000) compared favorably with a higher molecular weight KRYTOX TM fluids (AZ grade) and FOMBLIN TM fluids in thermal stability, as determined by thermogravimetric analysis. Perfluorinated hexafluoroacetone copolymers of greater average number of repeat units up to 50 would have superior thermal stability (due to pendant groups), yet exhibit low liquid ranges (due to O—C—O units).

The invention is further illustrated by the following exemplification.

EXEMPLIFICATION

All gaseous reactants were measured by using vacuum line techniques and assuming ideal behavior. The reactants were degassed at liquid nitrogen temperatures and expanded into a 2.07 liter PYREX TM bulb connected to a mercury manometer. A PYREX TM tube which had been charged, under nitrogen, with the selected catalyst, was used as the reaction container. The reactants were condensed into the Pyrex tube at $-196°$ C., degassed again, and the tube was sealed. The tube was then brought to $-78°$ C. in a dry ice-acetone slush and slowly warmed to ambient temperature. The reactants were agitated at ambient temperature for six hours and then the temperature was raised to 65° C. for 36 hours. When the reaction was complete, the resulting product was held under vacuum to remove any unreacted monomer.

The fluorination apparatus used is described by Lagow, R. J., *Progress in Inorganic Chemistry*, 26, 161 (1979), incorporated by reference herein. The reaction conditions to preserve each polymer structure varied significantly. Optimized conditions are given under each synthesis below. Volatile products from the reaction were collected in a glass trap maintained at dry ice temperature. These products were washed with a KOH/H$_2$O mixture to remove any functional components, dried on molecular sieves and separated by gas chromatography to obtain pure compounds for analysis.

The resultant nonvolatile oils from the reaction were dissolved in Freon 113 (CF$_2$ClCCl$_2$1F) and filtered through a CELITE TM /NORIT TM bed to remove any foreign matter. The solvent was then removed under vacuum at 80° C. for 24 hours.

Physical analysis of the isolated compounds and the oligomeric oils were obtained in the following manner. Elemental analyses were performed by Schwarzkopf Microanalytical Laboratory, Inc., Woodside, N.Y., and Galbraith Laboratories, Inc., Knoxville, Tennessee. Infrared spectra were obtained with a Perkin Elmer 467 spectrometer utilizing a gas cell with KBr windows, or by casting a film (oils) from Freon 113 onto KBr plates. $^{19}$F NMR spectra were run on a Varian EM-390 spectrometer operating at 84.67 MHz. $^{13}$C[$^{19}$F] ($^{19}$F decoupled) NMR spectra were run on a Bruker WH-100 spectrometer. Mass spectra were obtained with a Bell and Howell 21-490 mass spectrometer with the ion source cooled to ambient temperature. Gas phase chromatography (GPC) was done on a Bendix 2300 programmable chromatograph equipped with a cryogenic controller and a thermal conductivity detector. The column used for sample separation was $\frac{3}{8}$ in. $\times$ 24 ft. packed with 10% FOMBLIN Z-25 TM on Chromosorb PTM (60/30 mesh), with a helium flow of 100 cc/min. GPC analyses were done using a Waters Associates Inc. system equipped with a R-401 differential refractometer and an IBM 10 micron GPC/SEC column. Thermogravimetric analyses were obtained on a DuPont Model 990 Thermal Analyzer equipped with a DuPont Model 951 Thermogravimetric Analyzer.

Hexafluoroacetone/Ethylene Oxide Copolymer (HFA/EO)

Five milligrams of (C$_2$H$_5$)$_4$NCl were added to $4.65 \times 10^{-2}$ moles each of HFA and EO. The resultant polymer weighed 8.6 grams and this corresponds to a yield of 88%. The white crystalline powder had a melting range of 182°-184° C. (lit. 188°-192° C., G. E. Gerhardt and R. J. Lagow, *J. Chem. Soc., Perkin Trans.* 1, 1321 (1980); G. E. Gerhardt et al., *J. Polym. Sci. Polym. Chem.* Ed. 18, 157 (1979). Elemental analysis gave C, 28.65; F, 54.50; H, 1.96 (Theor. C, 28.57; F, 54.29; H, 1.90); confirming a 1:1 copolymer.

Due to the crystalline nature of the polymer ambient conditions were first studied for the fluorination procedure. These conditions proved to be unsatisfactory as significant cleavage to hydrogen-containing volatile products occurred before pure fluorine conditions could be reached. Subsequently low temperatures were found to be necessary early in the reaction to assure perfluorinated oil. Initial conditions were therefore set at $-78°$ C. and the total sequence of reaction conditions can be seen in Table 1.

TABLE I

| | Copolymer Fluorination Conditions | | |
|---|---|---|---|
| time, h | He, cm$^3$/min | F$_2$, cm$^3$/min | temp, °C. |
| | | HFA/EO | |
| 24 | 50 | 1.0 | −78 |
| 24 | 0 | 2.0 | −78 |
| 24 | 0 | 2.0 | amb |
| 12 | 0 | 2.0 | 35 |
| 12 | 0 | 2.0 | 45 |
| 12 | 0 | 2.0 | 55 |
| 12 | 0 | 2.0 | 65 |
| 12 | 0 | 2.0 | 70 |

TABLE I-continued quently separated and characterized. The results are shown in Table II.

TABLE II

Perfluoro Ethers Isolated from Hexafluoroacetone/Ethylene Oxide Polymer Fluorination

| compd | $^{19}$F shift (ppm)/rel intensity | highest m/e in mass spec |
|---|---|---|
| (1) $(CF_3)_2CFOCF_3$<br>     a    b   c | (a) 83.3/6, (b) 148.2/1,<br>(c) 56.6/3 | 235 $(C_2F_6O)$,<br>P-F |
| (2) $CF_3OC(CF_3)_2OCF_3$<br>     a      b     a | (a) 57.3/1, (b) 78.7/1 | 301 $(C_5F_{11}O_2)$,<br>P-F |
| (3) $(CF_3)_2CFOCF_2CF_2OCF(CF_3)_2$<br>     a    b   c   c   b    a | (a) 83.3/6, (b) 146.9/1,<br>(c) 88.5/2 | 451 $(C_8H_{17}O_2)$,<br>P-F |
| (4) $CF_3OC(CF_3)_2OCF_2CF_2OCF(CF_3)_2$<br>    a      b     c    d    e    f | (a) 56.7/3, (b) 78.4/6,<br>(c) 89.7/2, (d) 87.7/2,<br>(e) 147.1/1, (f) 83.2/6 | 467 $(C_8F_{17}O_3)$,<br>P-$CF_3$ |
| (5) $CF_3OC(CF_3)_2OCF_2CF_2OC(CF_3)_2OCF_3$<br>    a      b     c    c     b    a | (a) 57.1/3, (b) 78.7/6,<br>(c) 89.7/2 | 545 $(C_{10}F_{14}O_4)$,<br>P-$F_3$ |
| (6) $(CF_3)_2CFOCF_2CF_2OC(CF_3)_2OCF_2CF_2OCF(CF_3)_2$<br>     a    b    c    d      e    d    c    b    a | (a) 83.2/6, (b) 147.1/1,<br>(c) 87.7/2, (d) 88.1/2,<br>(e) 73.3/3 | 733 $(C_{13}F_{27}O_4)$,<br>P-F |
| (7) $CF_3OC(CF_3)_2OCF_2CF_2OC(CF_3)_2OCF_2CF_2OCF(CF_3)_2$<br>    a      b     c    c      b    c    d    e    f | (a) 56.6/3.1, (b) 78.3/11.6,<br>(c) 89.0/5.9, (d) 87.6/2.0,<br>(e) 147.1/1.0, (f) 83.2/6.0 | 799 $(C_{14}H_{29}O_5)$,<br>P-F |
| (8) $(CF_3)_2CFO[CF_2CF_2OC(CF_3)O]_xCF_3$<br>     a    b    c    c    d     e | (a) −81.3, (b) −145.7,<br>(c) −87.7, (d) −76.6,<br>(e) −54.9 | |

Copolymer Fluorination Conditions

| time, h | He, cm$^3$/min | F$_2$, cm$^3$/min | temp, °C. |
|---|---|---|---|
| 12 | 0 | 2.0 | 70 |
| 12 | 60 | 0 | 70 |
| HFA/PO and HFA/TMO | | | |
| 60 | 100 | 1.0 | amb |
| 24 | 0 | 1.0 | amb |
| 24 | 0 | 1.0 | 35 |
| 24 | 0 | 1.0 | 45 |
| 12 | 0 | 1.0 | 50 |
| 12 | 0 | 1.0 | 50 |

These conditions proved to be advantageous as degradation yielding extremely volatile products (those which are volatile at −78° C.) was kept to an acceptable level and a reasonable amount of nonvolatile perfluoropolyether oil was also obtained. After each temperature increment the volatile products were weighed and analyzed by gas chromatography. The relative amount of volatile products at each temperature was the same indicating that the same fragmentation processes were responsible for the volatile species over the entire temperature range. There was also no threshold temperature (up to 70° C.) above which all of the polymer degraded to volatile species. Infrared analysis of the nonvolatile oil proved it contained functional end groups, as would be expected by the cleavage route (see Discussion section). To obtain a nonfunctional product the oil was allowed to air hydrolyze thus allowing the carbonyl fluoride end groups to be hydrolyzed to carboxylic acid end groups. These acid groups were then removed by further reaction with elemental fluorine which causes decarboxylation leaving behind perfluoro nonfunctional end groups. Infrared analysis of the volatile by-products revealed that they also contained a substantial quantity of functionality. The volatile fractions were washed with a KOH/H$_2$O solution leaving behind the nonfunctional polyethers. These were subsequently separated and characterized. The results are shown in Table II.

The infrared spectra for the seven isolated compounds were all similar in showing a strong broad absorption in the carbon-fluorine and ether carbon-oxygen region (1350-1050 cm$^{-1}$) as well as strong, sharp characteristic absorptions in the region at 1000-980, and 730-660 cm$^{-1}$. Additionally a peak at 890-870 cm$^{-1}$ can be found in all molecules containing a perfluoromethoxy end group. The infrared spectrum of the resultant oil contains the same basic features with no trace of functional groups.

Mass spectrometry was extremely useful for determining the molecular weights of the volatile components. By running the ion source of the spectrometer at ambient the extensive fragmentation and rearrangements inherent in mass spectra of fluorocarbons can be kept to a minimum. This method resulted in the observation of parent minus fluorine ions for most of the volatile compounds (Table II) along with the characteristic fragmentation pattern.

The most useful method for structural identification proved to be $^{19}$F NMR. The perfluoroethers $^{19}$F NMR signals, assignments and relative intensities are listed in Table II. The average chemical shifts of the various fluorine nuclei were (in ppm from external CFCl$_3$): CF$_3$ of methyoxy end groups, −56 9; internal pendant groups, −78.5; CF$_3$ of isopropyl end groups, −83.2; all CF$_2$O groups, −88.5; CF of isopropyl end groups, −147.3. The observed coupling patterns are good examples of the unusual coupling characteristics often observed in $^{19}$F NMR spectroscopy. The CF$_3$ and CF groups of the isopropyl group do not couple with one another; however, they both couple with the CF$_2$ "across" the oxygen linkage yielding average coupling constants of 5 and 21 Hz, respectively. All other coupling characteristics were routine.

The $^{13}$C [$^{19}$F] NMR data are in agreement with the assigned structure and are listed in Table III.

TABLE III

Perfluoro Ethers Isolated from Hexafluoroacetone/Ethylene Oxide Polymer Fluorination

| compd | $^{13}C\{^{19}F\}$shift, ppm | mp, °C. |
|---|---|---|
| (1) $(CF_3)_2CFOCF_3$<br>  a    b    c | (a) 118.0, (b) 102.5, (c) 119.3 | −123 |
| (2) $CF_3OC(CF_3)_2OCF_3$<br>  a    b   c   a | (a) 119.3, (b) 95.5, (c) 118.9 | −60 |
| (3) $(CF_3)_2CFOCF_2CF_2OCF(CF_3)_2$<br>  a    b   c  c   b    a | (a) 118.0, (b) 102.4, (c) 115.1 | −100 (bp 115° C.) |
| (4) $CF_3OC(CF_3)_2OCF_2CF_2OCF(CF_3)_2$<br>  a    b   c    d   d   e    f | (a) 120.2, (b) 95.9, (c) 118.7,<br>(d) 115.2, (e) 102.6, (f) 118.0 | −98 (bp 144° C.) |
| (5) $CF_3OC(CF_3)_2OCF_2CF_2OC(CF_3)_2OCF_3$<br>  a    b   c    d   d    b   c    a | (a) 120.3, (b) 96.0, (c) 118.8,<br>(d) 115.3 | 0 |
| (6) $(CF_3)_2CFOCF_2CF_2OC(CF_3)_2OCF_2CF_2OCF(CF_3)_2$<br>  a    b   c  c    d  e    c  c   b    a | (a) 118.0, (b) 102.6, (c) 115.1,<br>(d) 96.6, (e) 118.8 | −74 |
| (7) $CF_3OC(CF_3)_2OCF_2CF_2OC(CF_3)_2OCF_2CF_2OCF(CF_3)_2$<br>  a    b   c    d   d   b   c    d   d   e   f | (a) 120.1, (b) 95.8, (c) 118.8,<br>(d) 115.2, (e) 102.6, (f) 118.1 | −58 |
| (8) $(CF_3)_2CFO[CF_2CF_2OC(CF_3)_2O]_xCF_3$<br>  a    b    c    d   e    f | (a) 118.2, (b) 102.7, (c) 115.3,<br>(e) 118.9 | |

The average chemical shifts of the various carbon nuclei were (in ppm downfield from TMS): carbon of methoxy end groups, 119.8; carbon of pendant internal methyl groups, 118.8; carbon of isopropyl methyl groups, 118.0; carbon of $CF_2O$ groups, 115.2; tertiary carbon of isopropyl groups, 102.5; quaternary carbon, 96.0.

The physical characterization involving melting point determination was complicated by the problem of the liquids freezing to glasses rather than crystalline powders. Repeated analysis, however, gave reproducible results and these are found in Table III along with the boiling points of the two perfluoroethers which were obtained in sufficient amounts.

Table IV lists the yields of volatile products and oil obtained from a typical reaction relative to 1.0 gram of starting materials. From $^{19}F$ NMR end group analysis the average molecular weight of the perfluoropolyether oil was found to be 2,800.

TABLE IV

Yields of Compounds Produced by Fluorination of Hexafluoroacetone/Ethylene Oxide Copolymer[a]

| compd | GC retentn time, min | yield, mg | −78 frac, wt % | starting polymer, mol % |
|---|---|---|---|---|
| 1 | 1 | 57 | 10.9 | 3.8 |
| 2 | 3 | 69 | 13.2 | 4.5 |
| 3 | 11 | 122 | 23.2 | 8.7 |
| 4 | 21 | 149 | 28.3 | 10.5 |
| 5 | 29 | 45 | 8.6 | 3.1 |
| 6 | 40 | 54 | 10.4 | 3.9 |
| 7 | 52 | 24 | 4.5 | 1.7 |
| unseparated material | | 5 | 0.9 | 0.4[b] |
| total | | 525 | 100 | 36.6 |

[a]Yield of nonvolatile oil, 0.450 g; starting polymer, 33.8 mol %. Calculations based on 1.00 g of starting polymer. GC temperature program: 50° C. for 5 min; 75° C. for 20 min; 100° C. for 40 min.
[b]Assumes average molecule is a seven-carbon ether.

Hexafluoroacetone/Propylene Oxide Copolymer (HFA/PO)

Added to 4.8 milligrams of $(C_2H_5)_4NCl$ were $4.5 \times 10^{-2}$ moles of HFA and $4.5 \times 10^{-2}$ moles (3.15 cc) of PO. The polymer produced was a slightly yellow, amorphous solid with a melting point of 45°–50° C. The resultant polymer weighed 5.2 grams which corresponded to a yield of 52%.

Previous experience with oils and waxy solids has shown that such materials would be fluorinated best if they were coated on a support thus increasing the surface area available for fluorination. The polymer was dissolved in Freon 113 and Teflon TM powder was added. The solution was evaporated leaving behind a free running powder, much like the HFA/EO copolymer.

The structural similarity to the HFA/EO copolymer led us to use the previous fluorination conditions. It was found, however, that upon elevating the temperature to ambient much of the polymer readily degraded to volatile products, some of which were partially fluorinated and that upon reaching 35° C. extensive fragmentation occurred. The subsequent fluorination conditions selected are listed in Table I.

As with the HFA/EO copolymer the volatile products were collected and analyzed prior to each temperature change. It was found that if a nonvolatile product was desired it was essential that the temperature be maintained no higher than 50° C. The oil was allowed to hydrolyze prior to each elevation in temperature, thus assuring nonfunctional products.

The volatile products showed some functionalization by infrared analysis and the functionalization was removed in the same manner as for the HFA/EO copolymer. The resultant nonfunctional volatile portion differed only in quantity from fraction to fraction but not in composition. Chromatographic analysis proved the volatile fraction to be composed of predominately one compound with extremely small amounts of other components.

Mass spectral results and $^{19}F$ NMR results were again very useful in ascertaining the structure of the volatile compound, a perfluoro diether containing two isopropyl end groups and the internal branched propyl group. The mass spectrum gave a large parent minus fluorine peak while $^{19}F$ NMR analysis was not so straightforward owing to the extent of coupling and the proximity of the $CF_3$ and $CF_2$ resonances which were broadened and unresolved. Also, since the propylene group is unsymmetrical, the tertiary fluorines on the isopropyl groups are unequivalent and emerge as a sextet while the propylene tertiary fluorine appears as a broadened triplet. The assignment of the $CF_3$ and $CF_2$ groups was based on chemical shift information and coupling.

Infrared analysis of the volatile and nonvolatile components were very similar. The volatile product showed a strong, broad absorption in the carbon-fluorine and C—O—C region (1375-1025 cm$^{-1}$). Also there was a strong, sharp absorption in the region from 980-960 cm$^{-1}$ and a medium, broad peak in the 720-650 cm$^{-1}$ region. The nonvolatile component showed a strong, broad absorption (1350-1030 cm$^{-1}$) in the C—F, C—O—C region as well as medium intensity sharp peak from 980-960 cm$^{-1}$ and a weak, broad absorption in the region 730-670 cm$^{-1}$.

Complete analysis of both the volatile and nonvolatile products is given in Table V. The average molecular weight of the perfluoropolyether oil was determined to be 3,000 by $^{19}F$ NMR end group analysis.

found that conditions more similar to those used for the HFA/PO polymer produced better results. Finally it was found advantageous to combine the two techniques; once the polymer turned to a gel early in the fluorination process, it was dissolved in Freon 113 and coated on a Teflon powder support.

The infrared analysis of the volatile and nonvolatile products were very similar and corresponded closely to those of the two previous polymers. The carbon-fluorine and ether linkages showed a strong absorption at 1350-1030 cm$^{-1}$. In addition, a sharp absorption of medium intensity was seen in the region 990-960 cm$^{-1}$ as well as a weak, broad characteristic absorption in the 730-680 cm$^{-1}$ region.

$^{19}F$ NMR and mass spectral analysis again proved quite useful in establishing the structures of the three isolated compounds. Although only three volatile compounds were isolated, a variety of end groups were present, as seen by the $^{19}F$ data. Mass spectral results

TABLE V

| Products Isolated from Hexafluoroacetone/Propylene Oxide Fluorination[a] | | |
|---|---|---|
| compd | $^{19}F$ shift (ppm)rel intensity | mp/bp, °C. |
| (9) $(CF_3)_2CFOCF(CF_3)CF_2OCF(CF_3)_2$<br>    a      b   c   d   d   b   e | (a) −82.2/6, (b) −141.7/2, (c) −146.4/1,<br>(d) −81.3/5, (e) −82.5/6 | −107/134 |
| (10) $(CF_3)_2CF[OC(CF_3)_2OCF(CF_3)CF_2O]_x$<br>    a      b   c     d    e    e | (a) −80.4, (b) −145.7, (c) −77.1,<br>(d) −144.3, (e) −81.1 | |
| | $^{13}C\{^{19}F\}$shift, ppm | elem anal. |
| (9) $(CF_3)_2CFOCF(CF_3)CF_2OCF(CF_3)_2$ | (a) 118.2, (b) 103.1, (c) 103.7,<br>(d) 118.0, (e) 116.8, (f) 102.7 | Actual:<br>C, 20.86; F, 73.02. |
| (10) $(CF_3)_2CF[OCF(CF_3)CF_2OC(CF_3)_2]_x$<br>    a      b   c    d   e    f   g | (a) 118.3, (b) 103.0, (c) 103.8,<br>(d) 118.0, (e) 116.8, (f) 96.8, (g) 118.0 | Actual:<br>C, 21.78; F, 69.02.<br>Theory:<br>C, 21.56; F, 69.30. |

[a]Yield of volatile component = 520 mg = 87.5 wt % of volatile components. This is equivalent to 34.6 mol % of starting polymer based on 1.00 g. Yield of nonvolatile oil = 175 mg − 12.2 mol % of starting polymer.

Hexafluoroacetone/Trimethylene Oxide Copolymer (HFA/TMO)

To 5 milligrams of $Et_4NCl$ were added $3.21 \times 10^{-2}$ moles (2.1 cc) of TMO. The resultant white powdered polymer weighed 5.4 grams (75% yield) and had a melting point of 118°-121° C.

Considering the crystalline nature of the polymer, it was decided that conditions similar to those used for the HFA/EO copolymer would be utilized. Later it was gave parent minus fluorine or parent minus three fluorine as the highest molecular weight ion. The second is uncommon in perfluoropolyether fragmentation patterns. On the two most abundant volatile compounds and on the oil, $^{13}C$ [$^{19}F$] spectra were obtained. The average molecular weight of the oil was determined by $^{19}F$ NMR end group analysis and was found to be 2,800. Table VI and Table VII show the compiled analytical and spectral data for the products.

TABLE VI

| Volatile Perfluoro Ethers Isolated from Hexafluoroacetone/Oxetane Polymer Fluorination | | |
|---|---|---|
| compd | $^{19}F$ shift (ppm)/rel intensity | highest m/e in mass spec |
| (11) $(CF_3)_2CFOCF_2CF_2CF_2OCF(CF_3)_2$<br>    a      b   c    a    b    a | (a) 83.0/8, (b) 143.4/1, (c) 130.6/1 | 501 $(C_9F_{19}O_2)$,<br>P-F |
| (12) $CF_3OC(CF_3)_2OCF_2CF_2CF_2OCF(CF_3)_2$<br>    a      b   c    d   c    f | (a) 57.3/3, (b) 78.7/6, (c) 84.9/4,<br>(d) 130.8/2, (e) 147.0/1, (f) 83.6/6 | 529 $(C_{10}F_{19}O_3)$,<br>P-$F_3$ |
| (13) $(CF_3)_2CFOCF_2CF_2CF_2O(CF_3)_2OCF_2CF_3$<br>    a      b   c   d   c    f    f | (a) 83.0/6, (b) 146.3/1, (c) 83.8/4,<br>(d) 130.4/2, (e) 78.2/6, (f) 89.4/5 | 617 $(C_{11}F_{23}O_3)$,<br>P-F |
| (14) $(CF_3)_2CF[OCF_2CF_2CF_2OC(CF_3)_2]_xOCF_2CF_3$ | (a) −81.1, (b) −145.0, (c) −82.5,<br>(d) −129.7, (e) −76.4, (f) −87.2 | |

TABLE VII

| Volatile Perfluoro Ethers Isolated from Hexafluoroacetone/Oxetane Polymer Fluorination | | |
|---|---|---|
| compd | $^{13}C\{^{19}F\}$ shift, ppm | mp, °C. |
| (11) $(CF_3)_2CFOCF_2CF_2CF_2OCF(CF_3)_2$<br>    a      b   c    d   c    b    a | (a) 118.0, (b) 102.6, (c) 116.3, (d) 107.5 | −105 |

TABLE VII-continued
Volatile Perfluoro Ethers Isolated from Hexafluoroacetone/Oxetane Polymer Fluorination

| compd | $^{13}C\{^{19}F\}$ shift, ppm | mp, °C. |
|---|---|---|
| (12) not enough material to obtain spectra | | −95 |
| (13) $(CF_3)_2CFOCF_2CF_2CF_2OC(CF_3)_2OCF_2CF_3$<br>    a    b   c   d  c  e  f    g    f | (a) 118.0, (b) 102.6, (c) 116.4,<br>(d) 107.6, (e) 96.0, (f) 118.7, (g) 114.7 | −85 |
| (14) $(CF_3)_2CF[OCF_2CF_2CF_2OC(CF_3)_2]_x$<br>    a   b   c   d  c  e   f | (a) 118.0, (b) 102.6, (c) 116.5, (d) 107.8,<br>(e) 96.1, (f) 118.6 | |

DISCUSSION

Fluorination conditions were adjusted very carefully for each polymer system in a manner to preserve the structure. The HFA/EO system was the easiest to handle. The HFA/TMO was the most delicate. It is, however, common in the laboratory for yields and reaction techniques to improve significantly on further development of reactions.

The absence of end groups due to carbon-carbon bond cleavage along with the large relative amount of isopropyl end groups (especially in the HFA/PO system) is noteworthy. A mechanism consistent with chain scission at the branched carbon is illustrated.

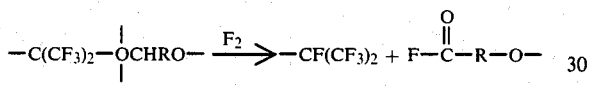

Further elimination of carbonyl fluoride would result in methyl end groups, in the case of the HFA/EO polymer:

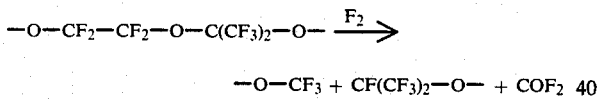

The fact that an equal amount of perfluoroisopropyl end groups and trifluoromethyl end groups were observed in the HFA/EO experiment supports such a view.

After obtaining average molecular weights, the new oils produced in this study were compared with commercial materials. The comparisons were done on a DuPont Thermogravimetric Analysis Differential Scanning Calorimeter to obtain values for $T_{\frac{1}{2}}$. Separate runs were done on each sample, one using helium as a pure gas and one using air as a purge gas. The tests with air would provide a measure of the polyether's stability in a moderately oxidative atmosphere. The fluids used for comparison were the Krytox AZ ($M_n$ 4000) and AA($M_n$ 6500) and the Fomblin TM Z-25 and Z-45 fluids. Numbers for the Krytox molecular weights were obtained by $^{19}F$ NMR end group analysis. The variety and type of pendant groups on the Fomblin fluids made it difficult to ascertain $M_n$ by this method. Further the physical property data on the Fomblin fluids are not really comparable to the new copolymers or to the Krytox data since they are of much greater molecular weight (10,000–15,000). The average $M_n$ of the synthesized fluids were also obtained by NMR end group analysis and are as follows: HFA/EO, $M_n$ 2,800; HFA/PO, $M_n$ 3,000; HFA/TMO, $M_n$ 2,800. Analysis by GPC using Freon 113 as the liquid phase also showed the fluids to be approximately the same $M_n$. These values correspond to a $DP_n$ of about 8.

Extrapolation of the $T_{\frac{1}{2}}$ data (Table VIII) indicates that the new fluids may have a lower vapor pressure than commercial fluids of comparable molecular weight and similar stability in oxidizing environments.

The synthesizing of these three new perfluoropolyethers, along with the characterization of eleven new volatile perfluoroethers, extends the range of perfluoropolyether structures available for study. The highly branched nature of these new oils, along with their morphologies, should prove interesting in exending the knowledge of lubrication properties and of many other types of physical properties of perfluoropolyethers. Particularly valuable will be the structure versus property content of such information.

INDUSTRIAL APPLICABILITY

The perfluorinated hexafluoroacetone/epoxide and hexafluoroacetone/oxetane copolymers of this invention are useful as high performance lubricants (oils and greases).

EQUIVALENTS

Those skilled in the art will recognize, or be able to ascertain using no more than routine experimentation, many equivalents to the specific embodiments of the invention described herein. Such equivalents are intended to be encompassed by the following claims.

We claim:
1. Perfluorinated hexafluoroacetone copolymers of the formula:

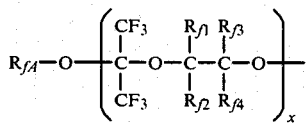

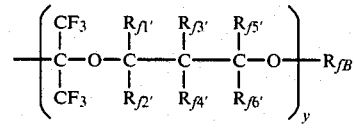

wherein
$R_f1$ and $R_{f1}$, are F, $CF_3$, $C_2F_5$, $C_3F_7$, C-$C_6F_5$ or c-$C_6F_{11}$;
$R_{f2}$, $R_{f2}'$, $R_{f3}$ and $R_{f4}$ are F, $CF_3$ or $C_2F_5$;
$R_{f3}'$-$R_{f6}'$ if F or $CF_3$;
$R_{fA}$ is $CFR_{f1}R_{f2}R_{f3}R_{f4}$, $CFR_{f3}R_{f4}$, $CFR_1'R_{f2}'CR_{f3}'R_{f4}'CR_{f5}'R_{f6}'$, $CFR_{f3}'R_{f4}'CR_{f5}'R_{f6}'$ or $CFR_{f5}'R_{f6}'$;
$R_{fB}$ is $CF_3$, $C_2F_5$ and $C_3F_7$;
and x and y are integers greater than 1 such that x+y=8–50.

2. Perfluorinated hexafluoroacetone/epoxide copolymers of the formula:

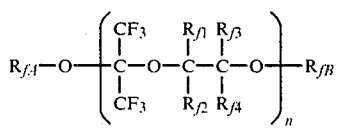

wherein $R_{f1}$ is $F$, $CF_3$, $C_2F_5$, $C_3F_7$, $c\text{-}C_6F_5$ or $c\text{-}C_6F_{11}$;

$R_{f2}$, $R_{f3}$ and $R_{f4}$ are $F$, $CF_3$ or $C_2F_5$;

$R_{fA}$ is $CFR_{f1}R_{f2}CR_{f3}R_{f4}$ or $CFR_{f3}R_{f4}$;

$R_{fB}$ is $CF_3$, $C_2F_5$ or $C_3F_7$; and $n=8\text{-}50$.

3. Perfluorinated hexafluoroacetone/ethylene oxide copolymer of the formula:

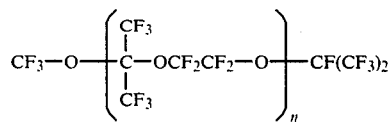

wherein $n=8\text{-}50$.

4. Perfluorinated hexafluoroacetone/propylene oxide copolymer of the formula:

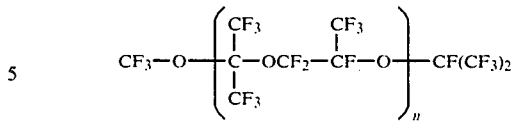

wherein $n=8\text{-}50$.

5. Perfluorinated hexafluoroacetone/oxetane copolymer of the formula:

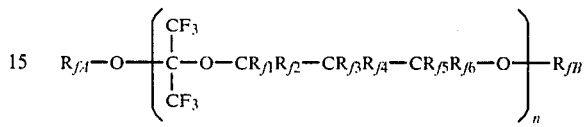

wherein $R_{f1}$ is $F$, $CF_3$, $C_2F_5$, $C_3F_7$, $c\text{-}C_6F_5$ or $c\text{-}C_6F_{11}$;

$R_{f2}$ is $CF_3$ or $C_2F_5$;

$R_{f3}\text{-}R_{f6}$ is $F$ or $CF_3$;

$R_{fA}$ is $CFR_{f1}R_{f2}CR_{f3}R_{f4}CR_{f5}R_{f6}$, $CFR_{f3}R_{f4}CR_{f5}R_{f6}$ or $CFR_{f5}R_{f6}$;

$R_{fB}$ is $CR_3$, $C_2F_5$ or $C_3F_7$: and $n=8\text{-}50$.

6. Perfluorinated hexafluoroacetone/oxetane copolymer of the formula:

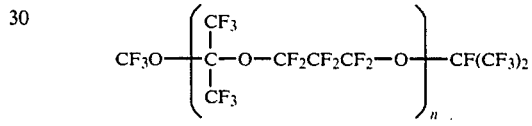

wherein $n=8\text{-}50$.

* * * * *